United States Patent
Lee et al.

(10) Patent No.: US 12,240,190 B2
(45) Date of Patent: Mar. 4, 2025

(54) METHOD OF MANUFACTURING WIND TURBINE BLADE

(71) Applicant: DOOSAN ENERBILITY CO., LTD., Changwon-si (KR)

(72) Inventors: Sang Hoon Lee, Suwon (KR); In Gyu Oh, Hwaseong (KR); Seung Jun Lee, Seoul (KR); Wan Don Joo, Bucheon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 330 days.

(21) Appl. No.: 17/720,327

(22) Filed: Apr. 14, 2022

(65) Prior Publication Data

US 2022/0355555 A1    Nov. 10, 2022

(30) Foreign Application Priority Data

May 4, 2021    (KR) ......................... 10-2021-0057988

(51) Int. Cl.
| | |
|---|---|
| B29C 70/44 | (2006.01) |
| F03D 1/06 | (2006.01) |
| B29K 63/00 | (2006.01) |
| B29K 67/00 | (2006.01) |
| B29K 307/04 | (2006.01) |

(Continued)

(52) U.S. Cl.
CPC .......... *B29C 70/443* (2013.01); *F03D 1/0675* (2013.01); *B29K 2063/00* (2013.01); *B29K 2067/00* (2013.01); *B29K 2307/04* (2013.01); *B29K 2309/08* (2013.01); *B29L 2031/085* (2013.01)

(58) Field of Classification Search
CPC . B29C 70/443; F03D 1/0675; B29K 2063/00; B29K 2067/00; B29K 2307/04; B29K 2309/08; B29L 2031/085; Y02E 10/74; B29D 99/0028
See application file for complete search history.

(56) References Cited

U.S. PATENT DOCUMENTS

| 10,605,227 B2 | 3/2020 | Johnson |
|---|---|---|
| 2016/0040651 A1 | 2/2016 | Yarbrough |

FOREIGN PATENT DOCUMENTS

| DE | 10 2018 009339 A1 | 5/2020 |
|---|---|---|
| EP | 2239461 A2 | 10/2010 |

(Continued)

OTHER PUBLICATIONS

EP OA, dated Jun. 27, 2023.

(Continued)

*Primary Examiner* — Ryan J. Walters
(74) *Attorney, Agent, or Firm* — Harvest IP Law, LLP (57) ABSTRACT

A method of manufacturing a wind turbine blade capable of being easily manufactured and improving structural strength. The method of manufacturing the wind turbine blade includes performing spar cap formation in which a first-type spar cap having a structure in which support plates including reinforcing fibers are stacked and a second-type spar cap including reinforcing fiber sheets are formed, performing shell formation in which a pressure side shell and a suction side shell are formed by injecting a resin in a state in which the first-type spar cap, the second-type spar cap, and a core panel are disposed between an inner skin and an outer skin, and performing shell assembly in which the pressure side shell is joined to the suction side shell.

17 Claims, 4 Drawing Sheets

(51) Int. Cl.
  *B29K 309/08*       (2006.01)
  *B29L 31/08*        (2006.01)

(56)           References Cited

FOREIGN PATENT DOCUMENTS

| EP | 3026259 A1      | 11/2015 |
| EP | 3792049 A1      | 3/2021  |
| JP | 2009287514 A    | 12/2009 |
| JP | 5778758 B2      | 9/2015  |
| KR | 1020100087180 A | 8/2010  |
| KR | 1020130039468 A | 4/2013  |
| KR | 1020130084612 A | 7/2013  |
| KR | 1020130093531 A | 8/2013  |
| KR | 1020140110951 A | 9/2014  |
| KR | 1020200016367 A | 2/2020  |
| KR | 102123343 B1    | 6/2020  |
| WO | 2014139534 A1   | 9/2014  |
| WO | 2016015736 A1   | 2/2016  |

OTHER PUBLICATIONS

KR OA dated Feb. 22, 2022.
KR Decision to Grant, dated Aug. 4, 2022.
EESR, dated Sep. 21, 2022.

METHOD OF MANUFACTURING WIND TURBINE BLADE

CROSS-REFERENCE TO RELATED APPLICATION

This application claims priority to Korean Patent Application No. 10-2021-0057988, filed on May 4, 2022, the disclosure of which is incorporated herein by reference in its entirety.

BACKGROUND

Technical Field

Apparatuses and methods consistent with exemplary embodiments relate to a method of manufacturing a wind turbine blade, and more particularly, to a method of manufacturing a wind turbine blade having spar caps.

Description of the Related Art

Wind power generation refers to a method for generating electric power by using a windmill to convert wind energy into mechanical energy (i.e., rotational force) and then driving a generator to obtain electrical energy.

Wind power generation is being actively invested in the United States and Asia as well as in Europe, because wind power is the most economical renewable energy source developed so far and it is an indefinite, cost-free, and clean energy source that can be generated using wind.

The wind turbine for wind power generation may be classified into a vertical-axis wind turbine and a horizontal-axis wind turbine according to the direction of the rotary shaft. For example, the horizontal-axis wind turbine has been mainly applied to commercial wind farms because the horizontal-axis wind turbine is more efficient and more stable than the vertical-axis wind turbine.

The wind turbine includes a plurality of blades, and each blade is provided with spar caps to improve its strength. The spar caps are respectively disposed at an upper portion (i.e., suction side) and a lower portion (i.e., pressure side) of the blade and are connected through a shear web.

A plurality of spar caps may be installed in one blade. For example, four spar caps are installed between the core panels of the blade. Each spar cap must be bent and twisted according to the shape of the blade. However, the shape of the blade may be limited because it is difficult to bend or twist the spar cap depending on the constituent object. It is also necessary to prevent the formation of pores in the spar cap. If pores are formed in the spar cap, the strength of the spar cap may be decreased.

SUMMARY

Aspects of one or more exemplary embodiments provide a method of manufacturing a wind turbine blade capable of being easily manufactured while improving structural strength.

Additional aspects will be set forth in part in the description which follows and, in part, will become apparent from the description, or may be learned by practice of the exemplary embodiments.

According to an aspect of an exemplary embodiment, there is provided a method of manufacturing a wind turbine blade including: performing spar cap formation in which a first-type spar cap having a structure in which support plates including reinforcing fibers are stacked and a second-type spar cap including reinforcing fiber sheets are formed, performing shell formation in which a pressure side shell and a suction side shell are formed by injecting a resin in a state in which the first-type spar cap, the second-type spar cap, and a core panel are disposed between an inner skin and an outer skin, and performing shell assembly in which the pressure side shell is joined to the suction side shell.

The blade may have an airfoil cross-section and may include a pressure side, a suction side, a leading edge through which the wind enters, and a trailing edge through which the wind exits. In the performing shell formation, the second-type spar cap may be disposed on the pressure side.

In the performing shell formation, the second-type spar cap may be disposed adjacent to the trailing edge.

In the performing shell formation, the first-type spar cap may be disposed adjacent to the leading edge on the pressure side.

In the performing shell formation, the first-type spar cap may be disposed adjacent to the leading edge on the suction side.

In the performing shell formation, the first-type spar cap may be disposed adjacent to the trailing edge on the suction side.

In the performing shell formation, the first-type spar cap may include a plurality of first-type spar caps disposed each of a portion adjacent to the leading edge on the pressure side and portions adjacent to the leading edge and the trailing edge on the suction side, and the second-type spar cap may be disposed adjacent to the trailing edge on the pressure side.

The performing shell formation may include placing the outer skin on a main mold, placing the first-type spar cap, the second-type spar cap and the core panel on the outer skin, placing the inner skin above them, wrapping the main mold with a film-type cover, and connecting an inside of the cover to a vacuum pump to inject the resin in a state in which a vacuum pressure is applied to a space between the cover and the main mold.

Each of the outer skin and the inner skin may be formed of a glass fiber sheet or a carbon fiber sheet.

Each of the outer skin and the inner skin may be formed of a hybrid fiber sheet including glass and carbon fibers.

In the performing spar cap formation, the second-type spar cap may be formed by stacking the reinforcing fiber sheets on a mold and injecting a resin in a state in which the reinforcing fiber sheets are wrapped with a cover.

The reinforcing fiber sheets may be glass fiber sheets.

The resin may be a polyester resin or an epoxy resin.

In the performing spar cap formation, the first-type spar cap may be formed by stacking the support plates on a mold and injecting a resin into the mold to bond the support plates by a resin bonding layer.

The support plates may include carbon fibers.

In the performing spar cap formation, the support plates may be arranged such that an outer support plate has a smaller width than an inner support plate.

In the performing shell assembly, the first-type spar cap and the second-type spar cap may be coupled to a shear web.

The blade may have an airfoil cross-section, and may include a pressure side, a suction side, a leading edge through which the wind enters, and a trailing edge through which the wind exits. In the performing shell formation, the first-type spar cap may include two first-type spar caps disposed adjacent to the leading edge, and the second-type spar cap may include two second-type spar caps disposed adjacent to the trailing edge.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. It will be further understood that the terms "comprises/includes" and/or "have/has" when used in this specification, specify the presence of stated features, integers, steps, operations, components, parts, and/or combinations thereof, but do not preclude the presence or addition of one or more of other features, integers, steps, operations, components, parts, and/or combinations thereof.

Hereinafter, exemplary embodiments will be described with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 1:
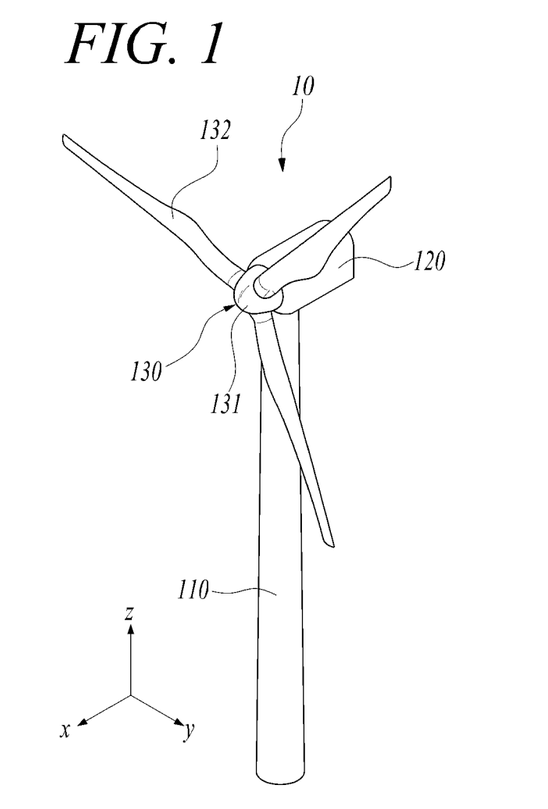
FIG. 1 is a perspective view illustrating a wind turbine according to an exemplary embodiment.

FIG. 1 is a perspective view illustrating the wind turbine according to an exemplary embodiment.

Referring to FIG. 1, the wind turbine 10 includes a tower 110, a nacelle 120, and a rotor 130. The wind turbine 10 may be installed on land or offshore, and may be a direct type with or without a gearbox.

The tower 110 is installed upright at a certain height on the ground or offshore and supports the nacelle 120 and the rotor 130. The tower 110 may have a tubular shape that increases in diameter from top to bottom. In this case, the tower 110 may have a multistage form in which a plurality of tubular members are stacked. For example, the inside of the tower 110 may be provided with a stair, a conveyor, or an elevator for transporting a worker or a work tool for maintenance.

The nacelle 120 may be installed on the tower 110 to be able to yaw with respect to the tower 110. In other words, the nacelle 120 may be positioned on the tower 110 and may be rotatably coupled to the tower 110.

The nacelle 120 may be a housing for accommodating a generator or the like, and may have a hexahedral shape. However, the shape of the nacelle 120 is not necessarily limited thereto, and the nacelle 120 may be formed in a cylinder, an ellipsoid, or the like.

The rotor 130 includes a hub 131 and a plurality of blades 132, and the hub 131 is rotatably installed on a front surface of the nacelle 120. The plurality of blades 132 are coupled to an outer peripheral surface of the hub 131 while being spaced apart from each other at predetermined intervals in a circumferential direction. Although FIG. 1 illustrates that three blades 132 are installed on one hub 131, but the present disclosure is not limited thereto.

The plurality of blades 132 are rotated about a central axis of the hub 131 by wind. Each of the blades 132 has a streamlined cross-section in a width direction, and a space may be formed therein.

Figure 2:
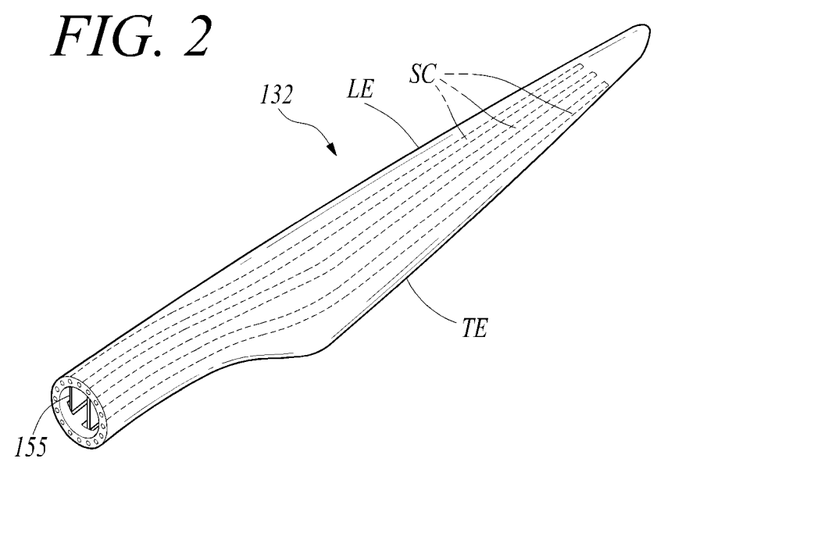
FIG. 2 is a perspective view illustrating one blade according to the exemplary embodiment.
Figure 3:
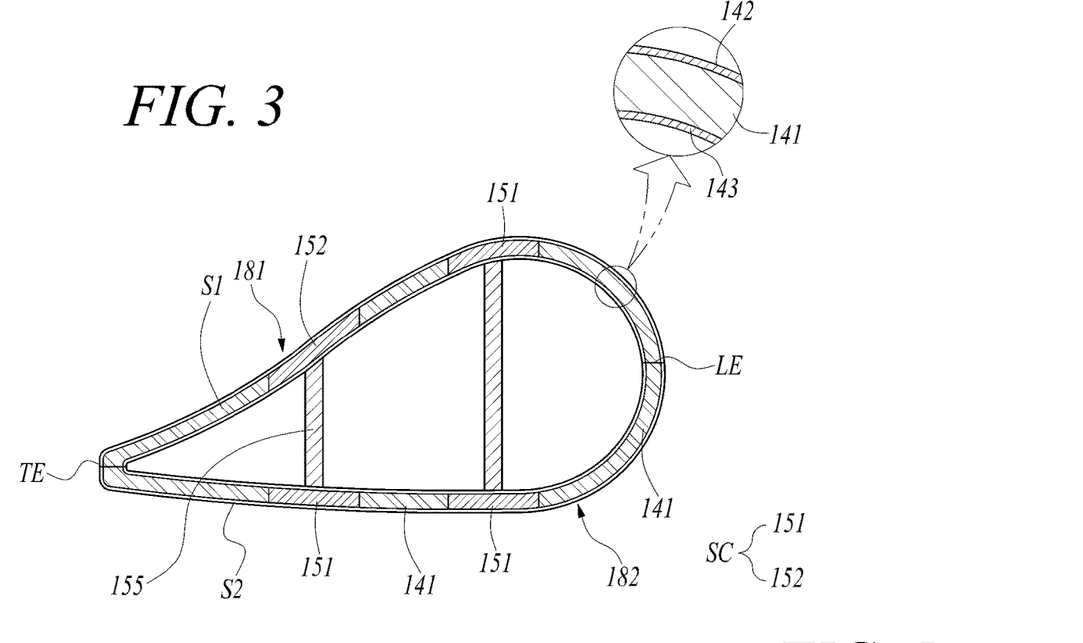
FIG. 3 is a cross-sectional view of the blade according to the exemplary embodiment.

FIG. 2 is a perspective view illustrating one blade according to the exemplary embodiment. FIG. 3 is a cross-sectional view of the blade according to the exemplary embodiment.

Referring to FIGS. 2 and 3, the blade 132 includes a cylindrical part connected to the hub 131 and has an airfoil cross-section outwardly.

The blade 132 having an airfoil cross-section includes a pressure side S1 and a suction side S2. The rotor 130 is rotated by the difference in pressure between the suction side S2 and the pressure side S1. The blade 132 includes a leading edge LE through which the wind enters, and a trailing edge TE through which the wind exits. The blade 132 has a relatively flat extension adjacent to the leading edge LE and a large bend adjacent to the trailing edge TE.

The blade 132 may include an outer skin 142, core panels 141, an inner skin 143, spar caps SC, and shear webs 155. The outer skin 142, the core panels 141, the inner skin 143, and the spar caps SC form a pressure side shell 181 and a suction side shell 182, and the pressure side shell 181 and suction side shell 182 are joined to form the blade 132.

The core panels 141 are positioned between the inner skin 143 and the outer skin 142. The blade 132 may be in a form of a sandwich panel in which the inner skin 143 and the outer skin 142 surround the core panels 141 and the spar caps SC.

The inner skin 143 and the outer skin 142 may be made of fiber-reinforced plastic (FRP). For example, the inner skin 143 and the outer skin 142 may be made of glass-fiber-reinforced plastic (GFRP) or carbon-fiber-reinforced plastic (CFRP). The core panels 141 may be made of balsa wood or foam. The core panels 141 may be made of urethane foam.

The spar caps SC are respectively positioned between the core panels 141 to enhance the rigidity of the blade 132. Each of the spar caps SC may be in a form of a plate having a predetermined width extending in a longitudinal direction of the blade 132. The spar caps SC are spaced apart from each other in a thickness direction of the blade 132 and are installed on the suction side S2 and the pressure side S1.

The shear webs 155 connect the spar caps SC installed on the pressure side S1 and the spar caps SC installed on the suction side S2, and are installed upright in the thickness direction of the blade 132. For example, two shear webs 155 spaced apart from each other in the width direction of the blade 132 may be installed in the blade 132. The shear webs 155 may extend in the longitudinal direction of the blade 132. Each of the shear webs 155 may be in the form of a sandwich panel and may support a load by connecting the associated spar caps SC. The shear web 155 may have a structure in which a foam or wood is inserted between metal plates or fiber-reinforced plastic plates.

Figure 4:
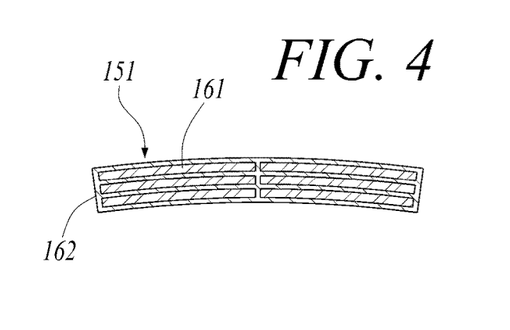
FIG. 4 is a cross-sectional view illustrating one first-type spar cap according to the exemplary embodiment.
Figure 5:
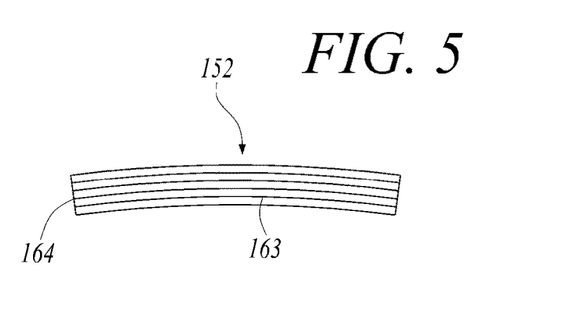
FIG. 5 is a cross-sectional view illustrating one second-type spar cap according to the exemplary embodiment.

FIG. 4 is a cross-sectional view illustrating one first-type spar cap according to the exemplary embodiment. FIG. 5 is a cross-sectional view illustrating one second-type spar cap according to the exemplary embodiment.

Referring to FIGS. 3 to 5, the spar caps SC may include a first-type spar cap 151 and a second-type spar cap 152. The first-type spar cap 151 may have a structure in which support plates 161 including reinforcing fibers are stacked, and the second-type spar cap 152 may have a structure in which a resin is impregnated with reinforcing fiber sheets 163.

The first-type spar cap 151 may include support plates 161 and a resin bonding layer 162 for fixing the support plates 161. Each of the support plates 161 may be an elongated plate formed by drawing a carbon fiber and a resin. The strength of the first-type spar cap 151 can be improved because the first-type spar cap 151 is formed by stacking the support plates 161 including the carbon fibers.

The second-type spar cap 152 may include reinforcing fiber sheets 163 and a resin body 164 for fixing the reinforcing fiber sheets 163, and may be made of glass-fiber-reinforced plastic. Here, the reinforcing fiber sheet 163 may be glass fiber sheets.

The second-type spar cap 152 may have a structure in which a polyester resin or an epoxy resin is impregnated with the reinforcing fiber sheets 163 so that the reinforcing fiber sheets 163 are integrally formed with the resin body 164.

The first-type spar cap 151 is disposed on each of a portion adjacent to the leading edge LE on the pressure side S1 and portions adjacent to the leading edge LE and the trailing edge TE on the suction side S2. On the other hand, the second-type spar cap 152 is disposed adjacent to the trailing edge TE on the pressure side S1. That is, three first-type spar caps 151 and one second-type spar caps 152 may be installed on one blade 132.

The shear web 155 disposed adjacent to the trailing edge TE has one end coupled to an associated one of the first-type spar caps 151 and the other end coupled to the second-type spar cap 152. On the other hand, the shear web 155 disposed adjacent to the leading edge LE has both ends coupled to associated ones of the first-type spar caps 151. As described above, according to the first exemplary embodiment, the spar caps SC having different structures may be disposed on the ends of one shear web 155 to support the blade 132.

Hereinafter, a method of manufacturing a blade according to a first exemplary embodiment will be described.

Figure 6:
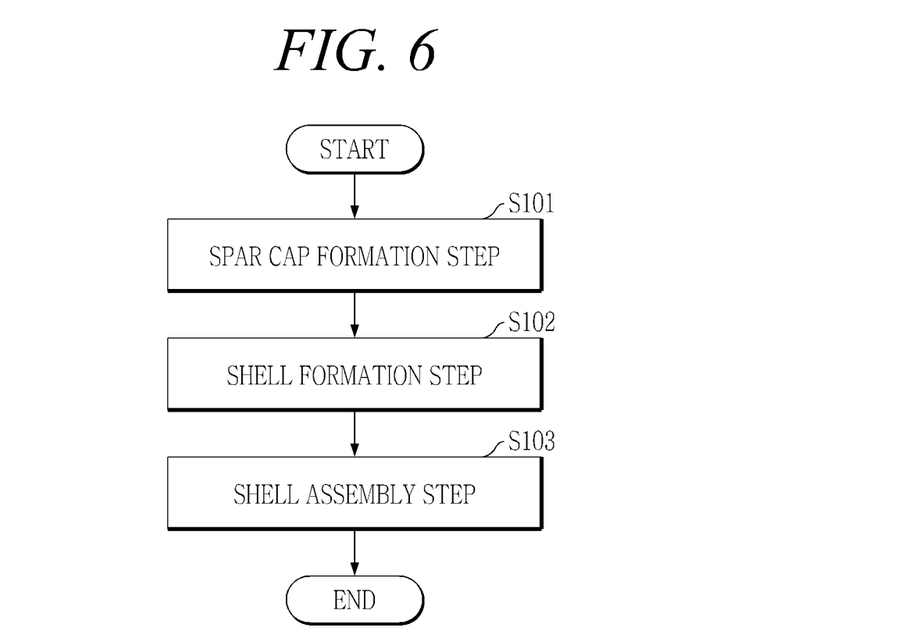
FIG. 6 is a flowchart for explaining a method of manufacturing a blade according to a first exemplary embodiment.
Figure 7:
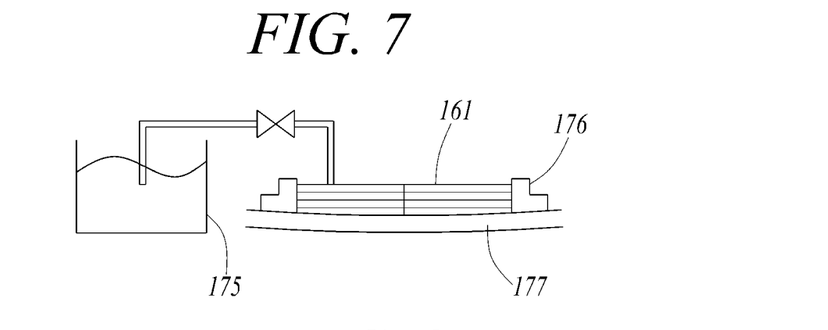
FIG. 7 is a view illustrating a process of manufacturing one first-type spar cap according to the first exemplary embodiment.
Figure 8:
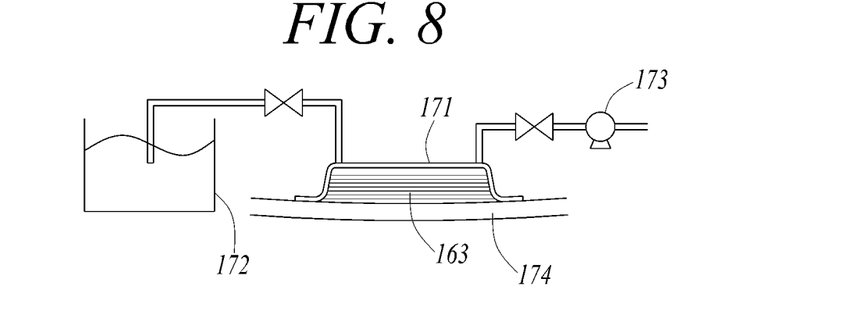
FIG. 8 is a view illustrating a process of manufacturing one second-type spar cap according to the first exemplary embodiment.
Figure 9:
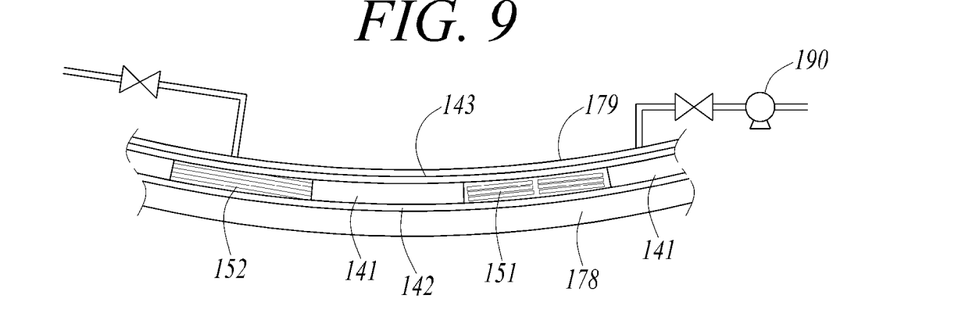
FIG. 9 is a view illustrating a shell formation process according to the first exemplary embodiment.

FIG. 6 is a flowchart for explaining a method of manufacturing a blade according to the first exemplary embodiment. FIG. 7 is a view illustrating a process of manufacturing the first-type spar cap according to the first exemplary embodiment. FIG. 8 is a view illustrating a process of manufacturing the second-type spar cap according to the first exemplary embodiment. FIG. 9 is a view illustrating a shell formation process according to the first exemplary embodiment.

Referring to FIGS. 6 to 9, the method of manufacturing a blade according to the first exemplary embodiment may include a spar cap formation step S101, a shell formation step S102, and a shell assembly step S103.

In the spar cap formation step S101, a first-type spar cap 151 having a structure in which support plates 161 including reinforcing fibers are stacked and a second-type spar cap 152 including reinforcing fiber sheets 163 are formed. The first-type spar cap 151 and the second-type spar cap 152 may be formed simultaneously or separately.

As illustrated in FIG. 7, the spar cap formation step S101 may include a support plate stacking step of stacking a plurality of support plates 161 on a mold 177, a guide block installation step of installing detachable guide blocks 176 at side ends of the stacked support plates 161, and a resin injection step of injecting the resin stored in a container 175 into the mold 177 to bond the support plates 161 by a resin bonding layer 162. If the stacked support plates 161 are bonded by the resin bonding layer 162, the first-type spar cap 151 is formed. Here, the resin may be a polyester resin or an epoxy resin.

As illustrated in FIG. 8, the spar cap formation step S101 may include a reinforcing fiber sheet stacking step of stacking a plurality of reinforcing fiber sheets 163 on a mold 174, a sheet wrapping step of wrapping the stacked reinforcing fiber sheets 163 with a film-type cover 171, and a vacuum resin injection step of discharging the air within the cover 171 by a vacuum pump 173 while injecting the resin stored in a container 172 into the mold 174. Here, the reinforcing fiber sheets 163 may be glass fiber sheets, and the resin may be a polyester resin or an epoxy resin.

Accordingly, the second-type spar cap 152 is formed by fixing the glass fiber sheets inside the resin body 164 while preventing pores from being formed between the reinforcing fiber sheets 163.

In the shell formation step S102, in a state in which the first-type spar cap 151, the second-type spar cap 152, and core panels 141 are disposed between an inner skin 143 and an outer skin 142, an epoxy resin or the like is injected to form a pressure side shell 181 and a suction side shell 182.

As illustrated in FIG. 9, the shell formation step S102 may include an outer skin placement step of placing the outer skin 142 on a main mold 178, a component placement step of placing a plurality of spar caps 151, 152 and core panels 141, an inner skin placement step of placing the inner skin 143 above them, a component wrapping step of wrapping the main mold 178 with a film-type cover 179, and a resin injection step of connecting the inside of the cover 179 to a vacuum pump 190 to inject a resin in a state in which a vacuum pressure is applied to the space between the cover 179 and the main mold 178.

Here, the outer skin 142 and the inner skin 143 may each be formed of a glass fiber sheet or a carbon fiber sheet. Alternatively, each of the outer skin 142 and the inner skin 143 may be formed of a hybrid fiber sheet including glass and carbon fibers.

If the resin is injected, the resin is bonded to the outer skin 142 and the inner skin 143. In addition, the outer skin 142 and the inner skin 143 may be integrally fixed to the core panels 141 and the spar caps 151, 152 by the resin.

In the shell formation step S102, the first-type spar cap 151 is disposed on each of a portion adjacent to the leading edge LE on the pressure side S1 and portions adjacent to the leading edge LE and the trailing edge TE on the suction side S2, and the second-type spar cap 152 is disposed adjacent to the trailing edge TE on the pressure side S1.

In the shell assembly step S103, the pressure side shell 181 and the suction side shell 182 are joined to each other, and the first-type spar cap 151 or the second-type spar cap 152 is coupled to an associated shear web 155. Here, one of the first-type spar caps 151 and the second-type spar cap 152 are coupled to the shear web 155 disposed adjacent to the trailing edge TE, and the other first-type spar cap 151 is coupled to the shear web 155 disposed adjacent to the leading edge LE.

Because the reinforcing fiber sheets 163 made of glass fibers have flexibility, the reinforcing fiber sheets 163 may easily reflect the bent shape and the twisted shape of the blade 132. However, it may be difficult for the support plates 161 to reflect the bent part of the blade 132 because the support plates 161 are relatively inflexible and are not easily bent.

According to the first exemplary embodiment, because the second-type spar cap 152 formed by impregnating the resin with the reinforcing fiber sheets 163 is disposed adjacent to the trailing edge TE of the pressure side S1, the freedom of design of the blade 132 can be improved by freely forming the shape of the trailing edge TE.

In addition, because the first-type spar caps 151 each having a structure in which the support plates 161 are stacked are disposed on the side of the leading edge LE extending in a straight line receiving a relatively large load, the strength of the blade 132 can be improved. Furthermore, because one of the first-type spar caps 151 in which the support plates 161 are stacked is disposed on the portion adjacent to the trailing edge TE on the suction side S2 which is relatively less bent compared to the pressure side S1, the strength of the blade 132 can be improved.

Figure 10:
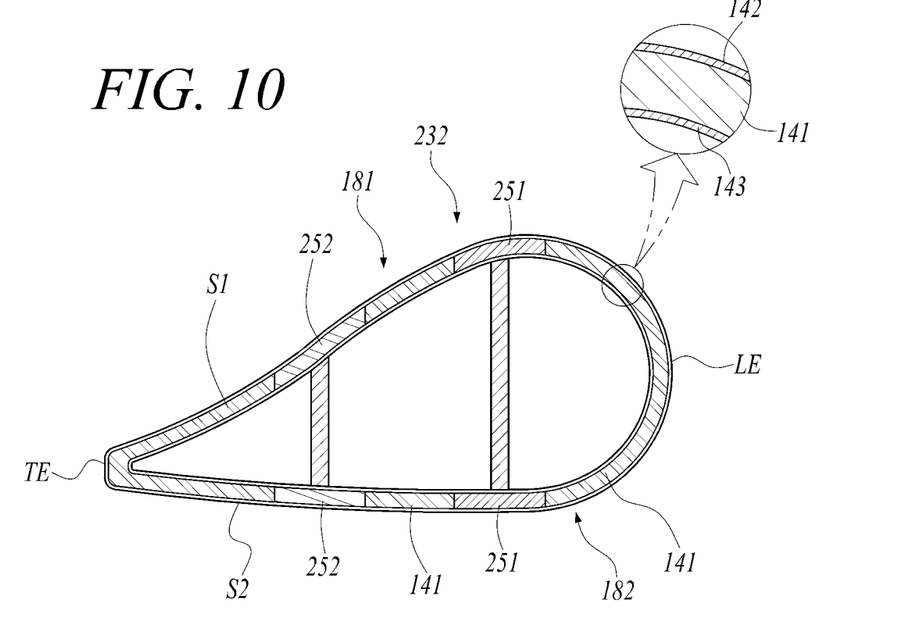
FIG. 10 is a cross-sectional view of one blade according to a second exemplary embodiment.

Hereinafter, a method of manufacturing a blade according to a second exemplary embodiment will be described. FIG. 10 is a cross-sectional view of one blade according to the second exemplary embodiment.

Referring to FIG. 10, because the method of manufacturing a blade according to the second exemplary embodiment has the same process as the method of manufacturing a blade according to the first exemplary embodiment except for a shell formation step, a redundant description will be omitted.

In the shell formation step, in a state in which first-type spar caps 251, second-type spar caps 252, and core panels 141 are disposed between an inner skin 143 and an outer skin 142, a resin is injected to form a pressure side shell 181 and a suction side shell 182.

In the shell formation step, the first-type spar caps 251 are disposed adjacent to the leading edge LE on the pressure side S1 and adjacent to the leading edge LE on the suction side S2, respectively. In the shell formation step, the second-type spar caps 252 are disposed adjacent to the trailing edge TE on the pressure side S1 and adjacent to the trailing edge TE on the suction side S2, respectively. Accordingly, the first-type spar caps 251 are disposed on the side of the leading edge LE of the blade 232, and the second-type spar caps 252 are disposed on the side of the trailing edge TE of the blade 232.

According to the second exemplary embodiment, because the second-type spar caps 252 each formed by impregnating the resin with the reinforcing fiber sheets 163 are disposed adjacent to the trailing edge TE, the freedom of design of the blade 232 can be improved by freely forming the shape of the trailing edge TE. In addition, because the first-type spar caps 251 each having a structure in which the support plates 161 are stacked are disposed on the side of the leading edge LE extending in a straight line receiving a relatively large load, the strength of the blade 232 can be improved.

Figure 11:
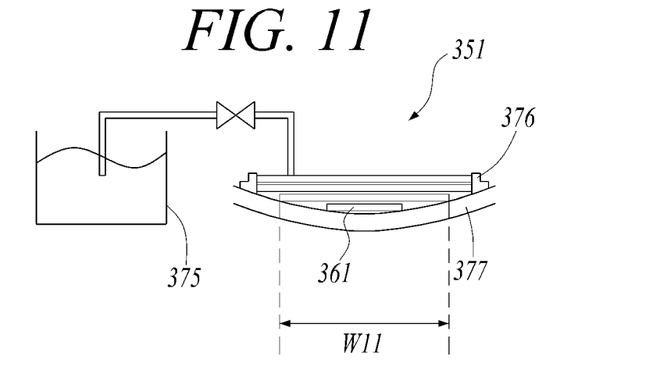
FIG. 11 is a view illustrating a process of manufacturing one first-type spar cap according to a third exemplary embodiment.

Hereinafter, a method of manufacturing a blade according to a third exemplary embodiment will be described. FIG. 11 is a view illustrating a process of manufacturing one first-type spar cap according to the third exemplary embodiment.

Referring to FIG. 11, a spar cap formation step may include a support plate stacking step of stacking a plurality of support plates 361 on a mold 377, a guide block installation step of installing detachable guide blocks 376 at the side ends of the stacked support plates 361, and a resin injection step of injecting the resin stored in a container 375 into the mold 377 to bond the support plates 361 by the resin.

The support plate stacking step is performed such that an outer support plate 361 has a smaller width W11 than an inner support plate 361. That is, the support plate 361 disposed adjacent to the outer skin 142 of the blade has a smaller width than the inner support plate 361.

Accordingly, because the first-type spar cap 351 is shaped to coincide with the outer surface of the blade curved in the form of an arc, the blade can be supported more stably.

As described above, according to the exemplary embodiments, the freedom of design of the blade can be improved because some spar caps include the reinforcing fiber sheets, and the strength of the blade can be improved because other spar caps each have a structure in which the support plates including the reinforcing fibers are stacked.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A method of manufacturing a wind turbine blade comprising:
   performing spar cap formation in which a first-type spar cap having a structure in which support plates including reinforcing fibers are stacked and a second-type spar cap including reinforcing fiber sheets are formed;
   performing shell formation in which a pressure side shell and a suction side shell are formed by injecting a resin in a state in which the first-type spar cap, the second-type spar cap, and a core panel are disposed between an inner skin and an outer skin; and
   performing shell assembly in which the pressure side shell is joined to the suction side shell,
   wherein, in the performing shell assembly, the first-type spar cap is coupled to one end of a shear web and the second-type spar cap is coupled to the other end of the shear web.

2. The method according to claim 1, wherein:
   the blade has an airfoil cross-section and comprises a pressure side, a suction side, a leading edge through which the wind enters, and a trailing edge through which the wind exits; and
   in the performing shell formation, the second-type spar cap is disposed on the pressure side.

3. The method according to claim 2, wherein, in the performing shell formation, the second-type spar cap is disposed adjacent to the trailing edge.

4. The method according to claim 3, wherein, in the performing shell formation, the first-type spar cap is disposed adjacent to the leading edge on the pressure side.

5. The method according to claim 4, wherein, in the performing shell formation, the first-type spar cap is disposed adjacent to the leading edge on the suction side.

6. The method according to claim 5, wherein, in the performing shell formation, the first-type spar cap is disposed adjacent to the trailing edge on the suction side.

7. The method according to claim 2, wherein, in the performing shell formation, the first-type spar cap includes a plurality of first-type spar caps disposed each of a portion adjacent to the leading edge on the pressure side and portions adjacent to the leading edge and the trailing edge on the suction side, and the second-type spar cap is disposed adjacent to the trailing edge on the pressure side.

8. The method according to claim 1, wherein the performing shell formation comprises placing the outer skin on a main mold, placing the first-type spar cap, the second-type spar cap and the core panel on the outer skin, placing the inner skin above them, wrapping the main mold with a film-type cover, and connecting an inside of the cover to a vacuum pump to inject the resin in a state in which a vacuum pressure is applied to a space between the cover and the main mold.

9. The method according to claim 8, wherein each of the outer skin and the inner skin is formed of a glass fiber sheet or a carbon fiber sheet.

10. The method according to claim 8, wherein each of the outer skin and the inner skin is formed of a hybrid fiber sheet including glass and carbon fibers.

11. The method according to claim 1, wherein, in the performing spar cap formation, the second-type spar cap is formed by stacking the reinforcing fiber sheets on a mold and injecting a resin in a state in which the reinforcing fiber sheets are wrapped with a cover.

12. The method according to claim 11, wherein the reinforcing fiber sheets are glass fiber sheets.

13. The method according to claim 12, wherein the resin is a polyester resin or an epoxy resin.

14. The method according to claim 1, wherein, in the performing spar cap formation, the first-type spar cap is formed by stacking the support plates on a mold and injecting a resin into the mold to bond the support plates by a resin bonding layer.

15. The method according to claim 14, wherein the support plates include carbon fibers.

16. The method according to claim 14, wherein, in the performing spar cap formation, the support plates are arranged such that an outer support plate has a smaller width than an inner support plate.

17. The method according to claim 1, wherein:
the blade has an airfoil cross-section and comprises a pressure side, a suction side, a leading edge through which the wind enters, and a trailing edge through which the wind exits; and
in the performing shell formation, the first-type spar cap includes two first-type spar caps disposed adjacent to the leading edge, and the second-type spar cap includes two second-type spar caps disposed adjacent to the trailing edge.

* * * * *